US008800698B1

(12) United States Patent
Mehr et al.

(10) Patent No.: US 8,800,698 B1
(45) Date of Patent: Aug. 12, 2014

(54) LNG—LITHIUM HYBRID VEHICLE (LLHV)

(71) Applicants: Nasser Fred Mehr, Fort Lauderdale, FL (US); Yadollah Parvizi, Long Beach, CA (US); Esfandiar Sharifi, Long Beach, CA (US); Michael Nekolny, Coral Springs, FL (US)

(72) Inventors: Nasser Fred Mehr, Fort Lauderdale, FL (US); Yadollah Parvizi, Long Beach, CA (US); Esfandiar Sharifi, Long Beach, CA (US); Michael Nekolny, Coral Springs, FL (US)

( * ) Notice: Subject to any disclaimer, the term of this patent is extended or adjusted under 35 U.S.C. 154(b) by 0 days.

(21) Appl. No.: 13/931,660

(22) Filed: Jun. 28, 2013

(51) Int. Cl.
B60K 6/20 (2007.10)
B60K 6/42 (2007.10)
B60K 6/485 (2007.10)
B60K 1/00 (2006.01)
B60K 6/46 (2007.10)

(52) U.S. Cl.
CPC ....................................... B60K 6/46 (2013.01)
USPC .................. 180/65.21; 180/65.22; 180/65.26; 180/65.31

(58) Field of Classification Search
USPC ................. 180/65.245, 65.21, 65.22, 65.225, 180/65.25, 65.26, 65.265, 65.275, 65.28, 180/65.285, 65.31, 69.4; 123/527; 74/478; 903/902–907
See application file for complete search history.

(56) References Cited

U.S. PATENT DOCUMENTS

| | | | | |
|---|---|---|---|---|
| 2,604,962 A * | 7/1952 | Milton Tibbetts | ............... | 74/470 |
| 4,608,830 A * | 9/1986 | Peschka et al. | ...................... | 62/7 |
| 5,713,426 A * | 2/1998 | Okamura | ................. | 180/65.245 |
| 6,116,363 A * | 9/2000 | Frank | ......................... | 180/65.25 |
| 6,307,277 B1 * | 10/2001 | Tamai et al. | ............... | 180/65.28 |
| 6,318,487 B2 * | 11/2001 | Yanase et al. | ............ | 180/65.245 |
| 6,429,613 B2 * | 8/2002 | Yanase et al. | ............... | 180/65.28 |
| 6,698,211 B2 * | 3/2004 | Gustafson | ....................... | 62/50.2 |
| 7,263,832 B2 * | 9/2007 | Nau et al. | ........................ | 60/606 |
| 7,434,407 B2 * | 10/2008 | Haberbusch et al. | ............... | 62/6 |
| 2002/0029770 A1 * | 3/2002 | Heffel et al. | .................. | 123/527 |
| 2007/0163819 A1 * | 7/2007 | Richter et al. | ............... | 180/65.2 |
| 2009/0018716 A1 * | 1/2009 | Ambrosio | ..................... | 903/904 |

* cited by examiner

Primary Examiner — J. Allen Shriver, II
Assistant Examiner — James M Dolak

(57) ABSTRACT

The invention of the LNG-Lithium Hybrid Vehicle (LLHV) combines Liquid Natural Gas (LNG) and lithium-ion battery power sources to propel the vehicle, said vehicle having an electric series motor for acceleration and a shunt motor for cruising. An accelerator engaging arm is attached to the primary acceleration pedal for the purpose of operating the series motor and the shunt motor. The invention further provides an LNG control system that routes power from the generator to either run the vehicle or recharge the lithium-ion batteries.

1 Claim, 4 Drawing Sheets

LNG—LITHIUM HYBRID VEHICLE (LLHV)

BACKGROUND OF THE INVENTION

1. Field of the Invention

The present invention relates to hybrid vehicles and more specifically to a design for a vehicle that combines the advantages of Liquid Natural Gas (LNG) and newly advanced lithium-ion industrial batteries.

2. Description of the Related Art

Hybrid vehicles are vehicles with built-in design features intended to either minimize or eliminate the vehicle's dependence on fossil fuels in order to operate. Different models of hybrid vehicles accomplish this goal in different ways. Some hybrid vehicles run on a combination of gas and electric power while others run on cleaner types of fuels and still others dispense completely with the use of gasoline.

Hybrid Vehicle Power Sources

The most common power sources for hybrid vehicles include: electricity, compressed or liquefied gas, hydrogen, gasoline and diesel fuel. Other less common sources are: electromagnetic fields, human power like pedaling and solar.

Battery Selection

The batteries that provide electric power to hybrid vehicles have been improved from the standard lead acid batteries with nickel-metal-hydride (NiMH) batteries and lithium-ion cell batteries now the preferred choices in hybrid vehicles. The advantages of lithium-ion batteries over NiMH batteries in hybrid vehicles include weight and storage capacity. To further explain, Nickel is a metal related to iron, well up on the periodic chart and it's quite dense. Lithium is in the same family as Sodium and Potassium and it is the lightest metal there is. For the same storage capacity, a NiMH battery will be smaller but the lithium-ion battery will weigh less. Also, NiMH batteries suffer from "memory effect" which may reduce the storage capacity. Since lithium-ion batteries are totally immune to "memory effect" and since the weight difference is very dramatic (a factor of two or more), the lithium battery appears to be the preferred battery at the time of this invention.

There are many reasons why inventions that eliminate or reduce the use of oil as the fuel source for vehicles are advantageous to everyone. Reduction of dependence on oil imports and effects on the environment from burning fossil fuels are among the top reasons. More importantly though, and less discussed, is the fact that oil is a limited resource, one that is very valuable in the production of plastics, pharmaceutical drugs, furniture foams, nylons, polyesters, ink, bubble gum, pesticides and fertilizers, heart valves, etc. to name a few.

Liquid natural gas is an environmental friendly and naturally abundant fuel. LNG offers higher performance and increased cruising distance over compressed natural gas since the molecules in the fuel storage tank are accelerated with compressed gas and require more storage space than liquid natural gas which is stored at −160 degrees C. (−260 degrees F.). Compressed natural gas's volumetric energy density is estimated to be 42% that of liquefied natural gas. Energy density is the amount of energy stored in a given system or region of space per unit volume.

The present invention of the LNG-Lithium Hybrid Vehicle (LLHV) introduces an environmental friendly hybrid vehicle design that is unique by it's utilization of liquid natural gas as the fuel source, a control system that routes the power from the LNG engine generator power to the electric motor to run the vehicle or to the lithium-ion batteries for recharging. This vehicle travels farther and runs more efficiently than current inventions because of the combination of these energy sources.

BRIEF SUMMARY OF THE INVENTION

In view of the benefits of conserving oil, reducing combustible fuel emissions and inventing hybrid vehicles, one object of this invention is to design a passenger vehicle that utilizes and combines the most advanced electric battery available today, cryogenic liquid fuel technology and battery recharging methods to maximize passenger hybrid vehicle cruising distance under safe operating conditions.

It is a further objective of the present invention to provide a design for the use of an electric series motor for accelerating the vehicle and an electric shunt motor for propelling the vehicle when cruising.

DETAILED DESCRIPTION

Figure 1:
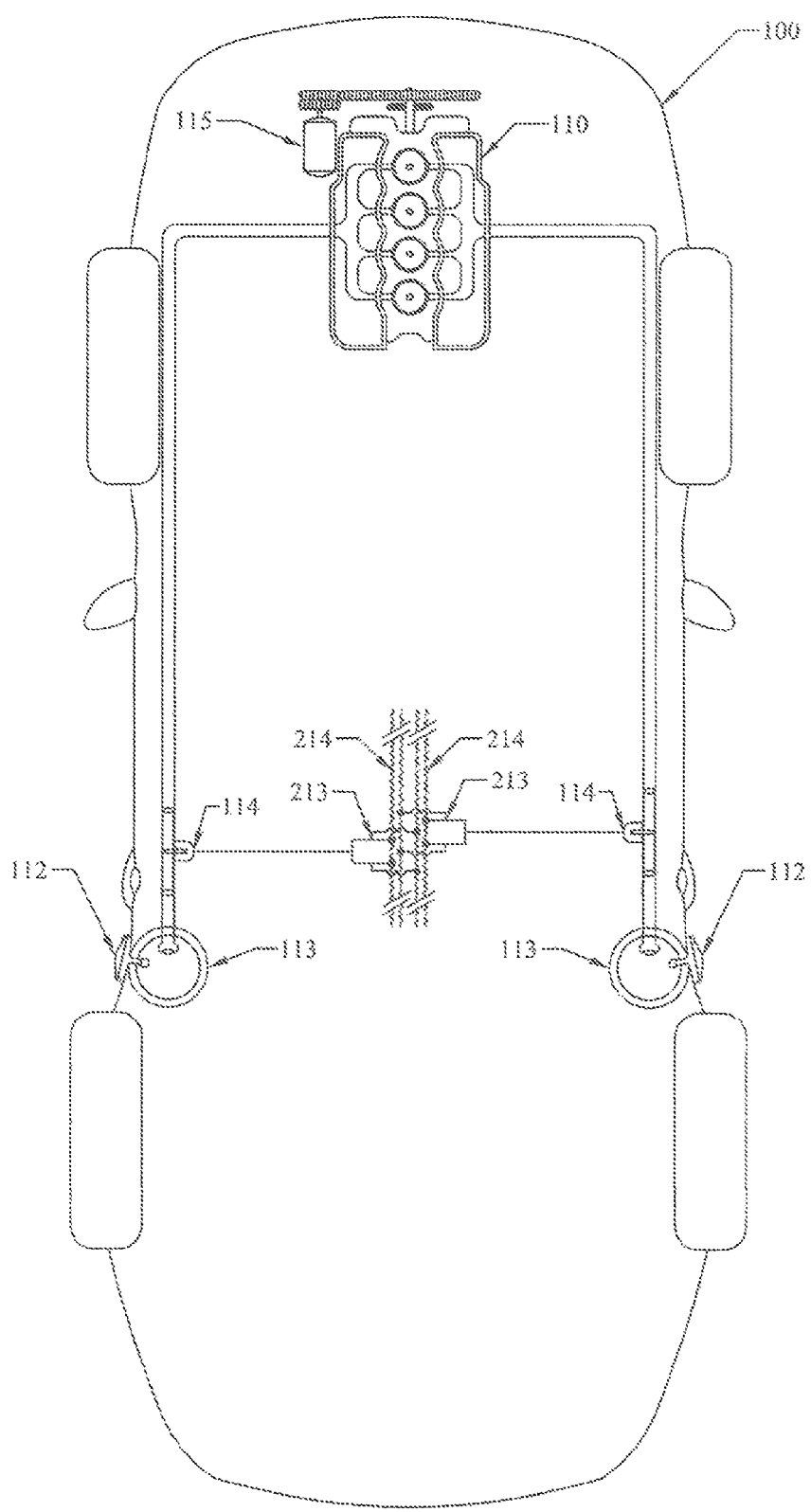
FIG. 1 is a view of the liquid natural gas (LNG) engine, the starter, the LNG control system that controls the LNG fuel valves (also shown in the figure) and the LNG refueling ports.
Figure 2:
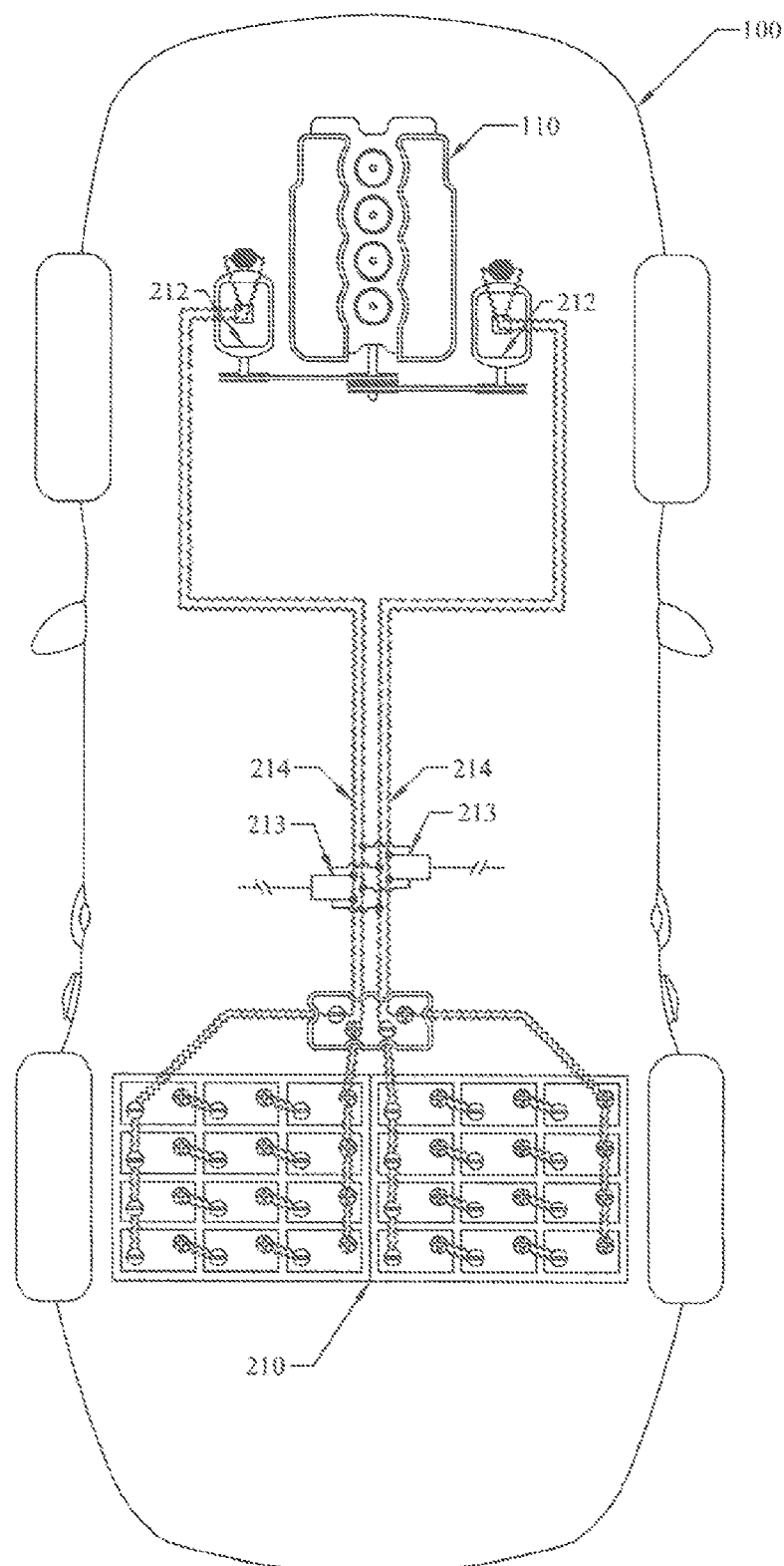
FIG. 2 provides a view of the two electric generators, the lithium-ion batteries and the power cables connecting the generators and the batteries.

This invention is a LNG-Lithium Hybrid Vehicle (LLHV) 100 powered by liquid natural gas and by one or more lithium-ion batteries 210 (FIG. 2). The specific embodiment in FIG. 1 is that of the LLHV 100 and more specifically, a liquid natural gas (LNG) engine 110 and the LNG fuel lines 111 each having an LNG fuel valve 112. LNG is stored in LNG cylinders 113 located toward the rear of the LLHV 100. These LNG cylinders 113 are the fuel tanks for the vehicle. Refueling the LLHV 100 is accomplished by inserting an LNG dispenser (not shown in the figures) from a LNG refueling station into one of the two LNG refueling ports 112. An electric starter motor 115 starts the LNG engine 110 upon ignition of the vehicle.

Figure 3:
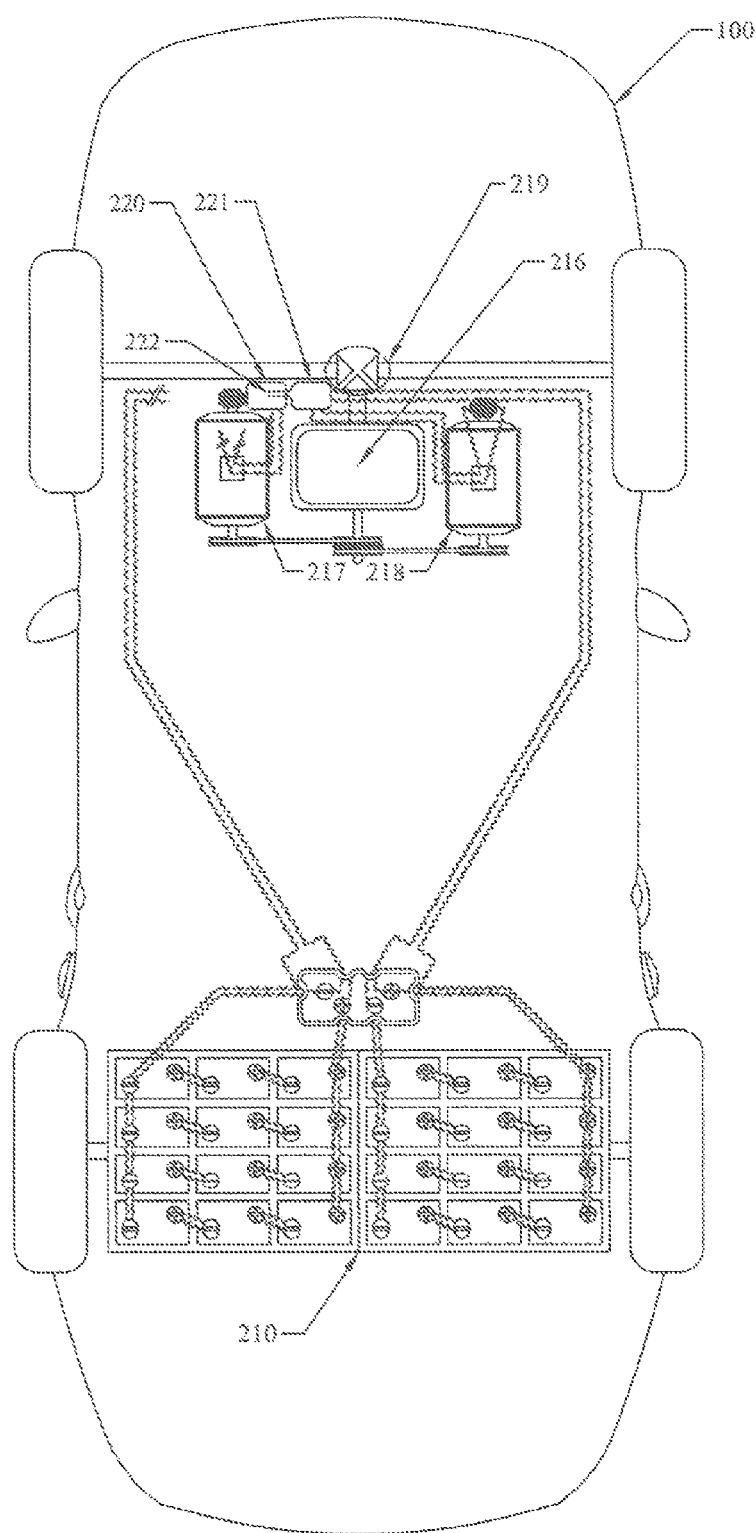
FIG. 3 identifies the foot pedal controlling the series motor and the accelerator engaging arm that is attached to the series motor foot pedal and engages the identified shunt motor pedal for cruising the vehicle more efficiently.
Figure 4:
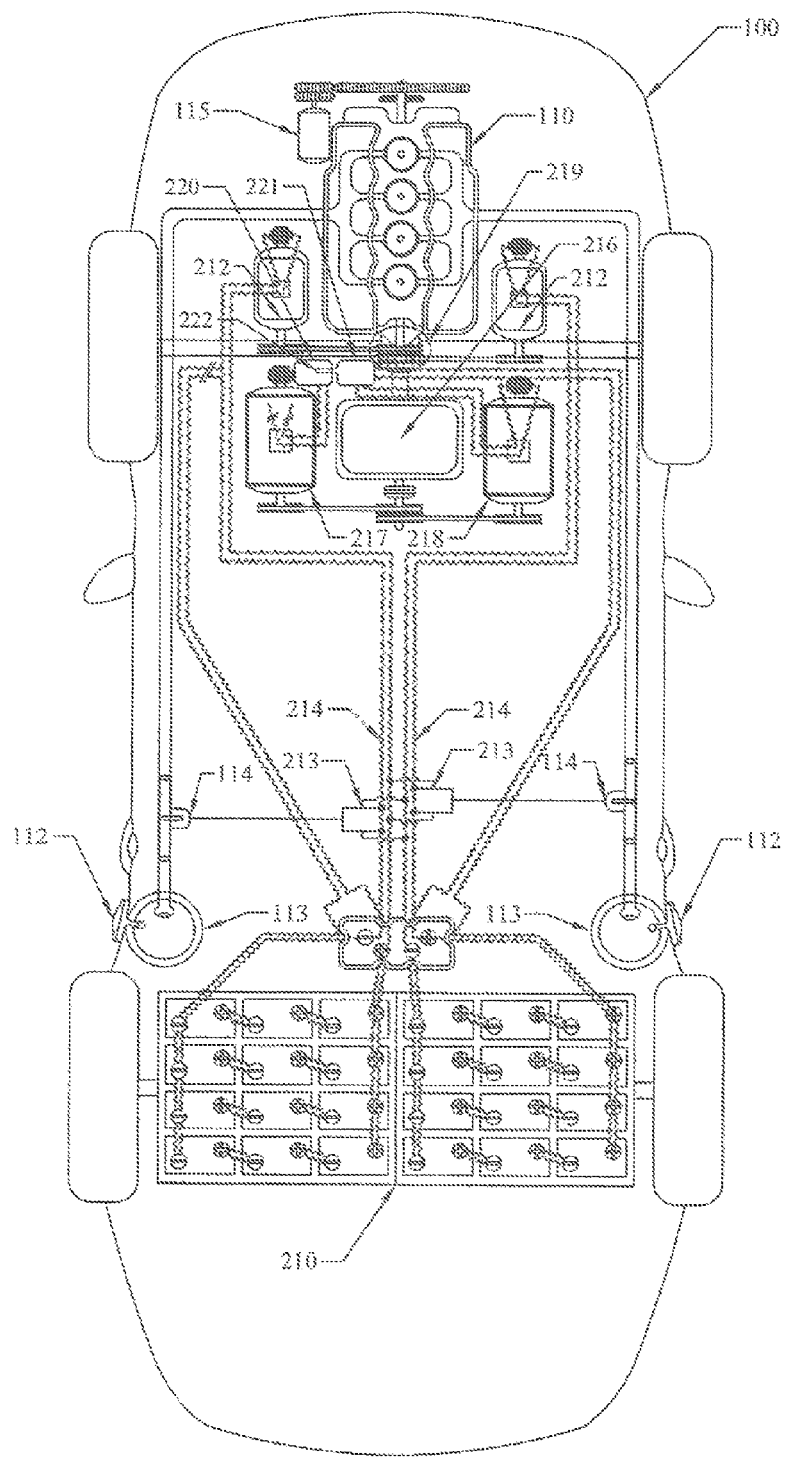
FIG. 4 is an overlay view of FIGS. 1, 2 and 3.

The specific embodiment in FIG. 2 provides a view of the positioning of the two electric generators 212, the energy storing lithium-ion batteries 210, the LNG control system 213 and the power cables 214 in the LLHV 100. FIG. 3 provides views of the LLHV's 100 mechanical power sources which are the series motor 217 and the shunt motor 218. It also identifies the series motor foot pedal 220, the shunt motor pedal 221 and an accelerator engaging arm 222 that is attached to the shunt motor pedal 221. For a complete depiction of the LLHV 100, images from FIG. 1, FIG. 2 and FIG. 3 are superimposed in FIG. 4.

LNG powers the LNG engine 110. The LNG engine 110 turns the crank shaft 219 which is connected through the gear box 216. Two drive belts connect the crank shaft pulley to the generator pulleys attached to two electric generators 212. The electric generators 212 convert the LNG engine's 110 thermal power to electrical power. The electrical power moves the LLHV 100 and is stored in the lithium-ion batteries 210. The efficiency of this conversion is about 35%. The power voltage could be 12 volt, 24 volt, 36 volt, 48 volt, 60 volt and 120 volts. The higher the voltage is, the lower the current will be so that less power is lost to heat.

Power cables 214 connect the electric generators 212 to the LNG control system 213. Voltage from the lithium-ion batteries 210 regulates the LNG fuel valve 114. A rise in voltage effects the LNG fuel valve 114 by reducing the LNG flow to the LNG engine 110. The LLHV 100 has a series motor foot pedal 220. This series motor foot pedal 220 is located to the left of the shunt motor pedal 221. The driver depresses the series motor foot pedal 220 when accelerating. At the point where the series motor foot pedal 220 engages the shunt motor pedal 221 by means of coming in contact with the attached accelerator engaging arm 222, operation of the electric shunt motor 218 begins. At this point both the series motor 217 and the shunt motor 218 are propelling the LLHV 100. This operation makes for the most efficient electrical powering of the LLHV 100.

We claim:

1. A green environmental friendly LNG-Lithium Hybrid Vehicle (LLHV) having a liquid natural gas (LNG) fueled engine that generates power stored in lithium-ion batteries by which said vehicle is propelled, comprising:

said LNG engine, the lithium-ion batteries, two LNG cylinder fuel tanks, a crankshaft, pistons, gears, belts, two direct current electric generators, one electric series motor for accelerating the vehicle, one electric shunt motor for assisting the series motor by providing power at cruising speeds, a series motor foot pedal, a shunt motor foot pedal having an attached accelerator engaging arm, an LNG fuel control system and delegated fuel lines;

wherein LNG fuel is stored in the two LNG cylinder fuel tanks and delivered to the LNG engine by way of the delegated fuel lines, said LNG engine turns the crankshaft which turns the belts connected to the two direct current electric generators; said electric generators convert the thermal energy from the LNG engine to useful electrical energy which is stored in the lithium-ion batteries; said lithium-ion batteries power the electric series motor for accelerating the vehicle and the electric shunt motor for assisting the series motor with powering the vehicle at cruising speeds;

said vehicle having two pedals, the series motor foot pedal that powers the series motor during acceleration and cruising and the shunt motor pedal having the attached accelerator engaging arm that operates the shunt motor when the series motor pedal comes into contact with the shunt motor pedal so that both motors operate at the same time providing efficient power to said LNG engine; and said vehicle having said LNG fuel control system that reads the voltage from the lithium-ion batteries and regulates the flow of the LNG fuel to said LNG engine.

* * * * *